(12) United States Patent
Ha et al.

(10) Patent No.: US 11,525,838 B2
(45) Date of Patent: Dec. 13, 2022

(54) AUTOMATIC ANALYZER

(71) Applicants: HITACHI HIGH-TECHNOLOGIES CORPORATION, Tokyo (JP); ROCHE DIAGNOSTICS OPERATIONS, INC., Indianapolis, IN (US)

(72) Inventors: Chikook Ha, Tokyo (JP); Mohamed Abouelsoud, Mannheim (DE)

(73) Assignees: HITACHI HIGH-TECH CORPORATION, Tokyo (JP); ROCHE DIAGNOSTICS OPERATIONS, INC., Indianapolis, IN (US)

( * ) Notice: Subject to any disclaimer, the term of this patent is extended or adjusted under 35 U.S.C. 154(b) by 363 days.

(21) Appl. No.: 16/646,206

(22) PCT Filed: Nov. 28, 2018

(86) PCT No.: PCT/JP2018/043850
§ 371 (c)(1),
(2) Date: Mar. 11, 2020

(87) PCT Pub. No.: WO2019/111790
PCT Pub. Date: Jun. 13, 2019

(65) Prior Publication Data
US 2020/0271683 A1 Aug. 27, 2020

(30) Foreign Application Priority Data
Dec. 5, 2017 (JP) .............................. JP2017-233689

(51) Int. Cl.
*G01N 35/10* (2006.01)
*G01N 35/00* (2006.01)
*G01N 35/04* (2006.01)

(52) U.S. Cl.
CPC ... *G01N 35/1002* (2013.01); *G01N 35/00732* (2013.01); *G01N 35/04* (2013.01); *G01N 2035/0401* (2013.01)

(58) Field of Classification Search
CPC ......... G01N 35/1002; G01N 35/00732; G01N 35/04; G01N 35/00584; G01N 35/00594; G01N 35/00712

(Continued)

(56) References Cited

U.S. PATENT DOCUMENTS

2003/0021728 A1* 1/2003 Sharpe, Jr. ........ G01N 35/00584
422/63
2005/0175506 A1* 8/2005 Matsubara ....... G01N 35/00712
422/68.1

(Continued)

FOREIGN PATENT DOCUMENTS

AU 2015261711 A1 * 12/2015 ............. G01N 27/62
DE 43 22 124 A1 1/1994

(Continued)

OTHER PUBLICATIONS

International Search Report of PCT/JP2018/043850 dated Feb. 12, 2019.

(Continued)

*Primary Examiner* — Edwyn Labaze
(74) *Attorney, Agent, or Firm* — Mattingly & Malur, PC (57) ABSTRACT

In an automatic analyzer in which required maintenance can be executed efficiently, without omission, an operation control unit controls operations of an analysis module (ISE, AU1, AU2) including a sample vessel transport mechanism, a reagent vessel transport mechanism, a reaction vessel transport mechanism, a sample dispensing mechanism, and a reagent dispensing mechanism, and of a display unit, and analyzes a sample accommodated in a reaction vessel. The (Continued)

operation control unit stores a validity period for each maintenance item of the analysis module (ISE, AU1, AU2) and an execution time for each maintenance item in a memory, displays an execution time together with an identification representation of execution priority level based on the expiration dates on the display unit, rearranges the display order of the maintenance items on the basis of the execution priority level, in accordance with an operator's instruction inputted through an operation input portion.

11 Claims, 10 Drawing Sheets

(58) Field of Classification Search
USPC .............................. 422/67, 63, 62, 64, 65, 50
See application file for complete search history.

(56) References Cited

U.S. PATENT DOCUMENTS

2008/0074945 A1* 3/2008 Murakami .............. B01F 31/86
366/110
2013/0311243 A1 11/2013 Taki et al.
2014/0039647 A1 2/2014 Fukushima

FOREIGN PATENT DOCUMENTS

| JP | 02-150770 A | 6/1990 |
| JP | 06-18530 A | 1/1994 |
| JP | 9-211003 A | 8/1997 |
| JP | 2006-88751 A | 4/2000 |
| JP | 2004-219352 A | 8/2004 |
| JP | 2005-163378 A | 6/2005 |
| JP | 2010-164332 A | 7/2010 |
| JP | 2012-18103 A | 1/2012 |
| JP | 2014-32022 A | 2/2014 |

OTHER PUBLICATIONS

Extended European Search Report received in corresponding European Application No. 18886435.9 dated Jul. 20, 2021.

* cited by examiner

| Item | Module | Date SU | Period SU | Exp. SU | Date ISE | Period ISE | Exp. ISE | Date MSB | Period MSB | Exp. MSB | Date AU1 | Period AU1 | Exp. AU1 | Date AU2 | Period AU2 | Exp. AU2 |
|---|---|---|---|---|---|---|---|---|---|---|---|---|---|---|---|---|
| Incubation Water Exchange | AU1 | - | - | - | - | - | - | - | - | - | 2017/03/05 12:02:15 | 1 | 2017/03/06 12:02:15 | - | - | - |
| Incubation Bath Cleaning | AU1 | - | - | - | - | - | - | - | - | - | 2017/03/02 13:15:15 | 7(80%) | 2017/03/09 13:15:15 | - | - | - |
| Change Reaction Cell | AU1 | - | - | - | - | - | - | - | - | - | 2017/02/16 14:14:36 | 30(90%) | 2017/03/14 14:14:36 | - | - | - |
| Sample Probe Wash | ISE AU1 | - | - | - | 2017/03/03 10:10:24 | 30(90%) | 2017/04/02 10:10:24 | - | - | - | 2017/01/31 10:08:24 | 30(90%) | 2017/03/01 10:08:24 | - | - | - |
| ISE Probe Check | ISE | - | - | - | 2016/09/20 20:17:48 | 180(90%) | 2017/03/19 20:17:48 | - | - | - | - | - | - | - | - | - |
| RFID Reader Check | ISE AU1 AU2 | - | - | - | 2017/02/28 10:10:50 | 14(80%) | 2017/03/06 10:10:50 | - | - | - | 2017/02/28 09:50:50 | 14(80%) | 2017/03/14 09:50:50 | 2017/03/01 09:50:50 | 14(80%) | 2017/03/15 09:50:50 |
| System Wash | AU1 AU2 | - | - | - | - | - | - | - | - | - | 2017/01/05 16:48:51 | 90(90%) | 2017/04/05 16:48:51 | 2017/12/15 16:48:51 | 90(90%) | 2017/03/15 16:48:51 |

| SU | ISE | MSB | AU1 | AU2 | Maintenance | Date |
|---|---|---|---|---|---|---|
| | | | ● | | Incubation Water Exchange | 2017/03/05 12:02:15 |
| | | | ● | | Incubation Bath Cleaning | 2017/03/02 13:16:15 |
| | | | ◎ | | Change Reaction Cell | 2017/02/16 14:14:36 |
| | ○ | | ● | | Sample Probe Wash | 2017/02/02 10:08:24 |
| | ○ | | | | ISE Probe Check | 2016/09/20 20:17:48 |
| ● | | | ◎ | ○ | RFID Reader Check | 2017/02/28 10:10:50 |
| | | | ◎ | ◎ | Systam Wash | 2016/12/15 16:48:51 |

2017/03/10 10:11:45

Select   Pipe

| SU | ISE | MSB | AU1 | AU2 | Maintenance | Date ▼ |
|---|---|---|---|---|---|---|
| | | | ● | | Incubation Water Exchange | 2017/03/05 12:02:15 |
| | | | ● | | Incubation Bath Cleaning | 2017/03/02 13:16:15 |
| | ○ | | ● | | Change Reaction Cell | 2017/02/02 10:08:24 |
| | ● | | ◎ | ○ | Sample Probe Wash | 2017/02/28 10:10:50 |
| | | | ◎ | | ISE Probe Check | 2017/02/16 14:14:36 |
| | | | ◎ | ◎ | RFID Reader Check | 2016/12/15 16:48:51 |
| | ○ | | | | Systam Wash | 2016/09/20 20:17:48 |

Select   Pipe

FIG. 8

| Module | Maintenance | Date |
|---|---|---|
| AU1 | Incubation Water Exchange | 2017/03/05 12:02:16 |
| AU1 | Incubation Bath Cleaning | 2017/03/02 9:15:15 |
| AU1 | Sample Probe Wash | 2017/02/02 10:08:24 |
| ISE | RFID Reader Check | 2017/02/28 10:10:50 |

FIG. 12

| Module | Maintenance | Date |
|---|---|---|
| AU1 | Incubation Water Exchange | 2017/03/05 12:02:15 |
| AU1 | Incubation Bath Cleaning | 2017/03/02 13:15:15 |
| AU1 | Sample Probe Wash | 2017/02/02 10:08:24 |

| SU | ISE | MSB | AU1 | AU2 | Maintenance | Date |
|---|---|---|---|---|---|---|
| | | | ● | | Incubation Water Exchange | 2017/03/05 12:02:15 |
| | | | ● | | Incubation Bath Cleaning | 2017/03/02 13:15:15 |
| | ○ | | ● | | Sample Probe Wash | 2017/02/02 10:08:24 |
| | | | ◎ | | Change Reaction Cell | 2017/02/16 14:14:36 |
| | ● | | ◎ | ○ | RFID Reader Check | 2017/02/28 10:10:50 |
| | | | ◎ | ◎ | System Wash | 2016/12/15 16:48:51 |
| | ○ | | | | ISE Probe Check | 2016/09/20 20:17:48 |

Select    Pipe

| Module | Maintenance | Date |
|---|---|---|
| AU1 | Incubation Water Exchange | 2017/03/05 12:02:15 |
| AU1 | Incubation Bath Cleaning | 2017/03/02 13:15:15 |
| AU1 | Sample Probe Wash | 2017/02/02 10:08:24 |

Pipe Setting:    ■ Power Up    □ Power Down

OK

AUTOMATIC ANALYZER

TECHNICAL FIELD

The present invention relates to an automatic analyzer that analyzes samples by use of reagents.

BACKGROUND ART

In an automatic analyzer, a sample accommodated in a sample vessel is aspirated by a sample dispensing mechanism, and is discharged into a reaction vessel. In addition, a reagent accommodated in a reagent vessel is discharged into the reaction vessel by a reagent dispensing mechanism, is discharged into the reaction vessel disposed in a reaction bath, to cause a reaction between the reagent and the sample, the reaction liquid is irradiated with light from a light source lamp, and the sample is analyzed by use of a photometer.

In the automatic analyzer, such consumables as reagents, the reaction vessel, the light source lamp and system water are present, and they should be replaced with new ones at suitable times.

Patent Document 1 discloses a technology in which the use degrees of the consumables are managed in an analyzer, scheduled replacement dates are calculated based on the use degrees and use limit values, and the scheduled replacement dates are displayed on a display.

PRIOR ART DOCUMENT

Patent Document

Patent Document 1: JP-2014-32022-A

SUMMARY OF THE INVENTION

Problem to be Solved by the Invention

In an automatic analyzer, other than the replacement of consumables, maintenance of the device should be made in order to keep a predetermined accuracy.

In short, in using an automatic analyzer, in order to maintain the reliability of measurement results, the analysis accuracy of the automatic analyzer should be maintained. The user using the automatic analyzer performs maintenance, to thereby maintain the reliability of the measurement results. The maintenance includes maintenance performed periodically in several days or several months, maintenance performed when an abnormal state is generated in the automatic analyzer, and the like. For the maintenance performed periodically, expiration dates are preliminarily set, and expired maintenance and expiration approaching maintenance should be reminded to the user.

The maintenance of the automatic analyzer include, for example, a reaction bath cleaning operation, a reaction bath water exchange operation, a washing operation for probes of a sample dispensing mechanism and reagent dispensing transfer, an RFID reader checking operation, and the like.

While maintenance of an automatic analyzer should include individual management of execution times as aforementioned, the management has been complicated.

Even when the technology described in Patent Document 1 is applied to execution of maintenance times for an automatic analyzer, it merely displays maintenance expiration dates, expiration approaching maintenance, and expired maintenance on a display.

In an automatic analyzer, an operation of replacing a consumable can be finished in a short time, an operation required for maintenance needs a longer time than that for a consumable replacing operation. Therefore, in the case where there are a plurality of expiration approaching maintenances and/or expired maintenances, it is necessary to determine which maintenance should be executed with priority, and in the case where there are a plurality of analysis units, it is necessary to determine whether or not execution order should be taken into account for each analysis unit and to execute maintenance efficiently.

In addition, in the maintenance, those which can be automatically executed by the automatic analyzer and those which need partial involvement of the operator are present in a mixed manner.

Therefore, in the automatic analyzer, it is requested that a plurality of maintenances are executed efficiently, without omission.

It is an object of the present invention is to realize an automatic analyzer which is able to execute required maintenance efficiently, without omission. It is also an object of the present invention to realize an automatic analyzer which is able to set a priority order of the maintenances to be executed, is able to support an operator when the operator should be involved in executing maintenance, and is able to execute required maintenance efficiently, without omission.

Means for Solving the Problem

In order to achieve the above object, the present invention is configured as follows.

An automatic analyzer includes: a sample vessel transport mechanism for transporting sample vessels; a reagent vessel transport mechanism for transporting reagent vessels; a reaction vessel transport mechanism including a reaction bath and operative to transport reaction vessels; a sample dispensing mechanism for dispensing a sample in the reaction vessel; a reagent dispensing mechanism for dispensing a reagent in the reaction vessel; a display unit; an operation input portion; a memory; and an operation control unit which controls the operations of an analysis module including the sample vessel transport mechanism, the reagent vessel transport mechanism, the reaction vessel transport mechanism, the sample dispensing mechanism and the reagent dispensing mechanism and of the display unit, and which conducts an analysis of the sample placed in the reaction vessel. In the automatic analyzer, the operation control unit stores, in the memory, an expiration date per maintenance item and execution time per maintenance item of the analysis module, displays, at the display unit, the execution time along with identification representation of execution priority based on the expiration date, rearranges the display order of the maintenance items based on the execution priority according to an operator's instruction inputted via the operation input portion, and displays the rearranged maintenance items at the display unit.

Advantages of the Invention

It is possible to realize an automatic analyzer capable of executing required maintenance efficiently, without omission. In addition, it is possible to realize an automatic analyzer capable of setting a priority order of maintenances to be executed, capable of supporting an operator when the operator should be involved in executing the maintenance, and capable of executing the required maintenance efficiently, without omission.

MODE FOR CARRYING OUT THE INVENTION

An embodiment of the present invention will be described below, referring to the drawings.

EMBODIMENT

Figure 1:
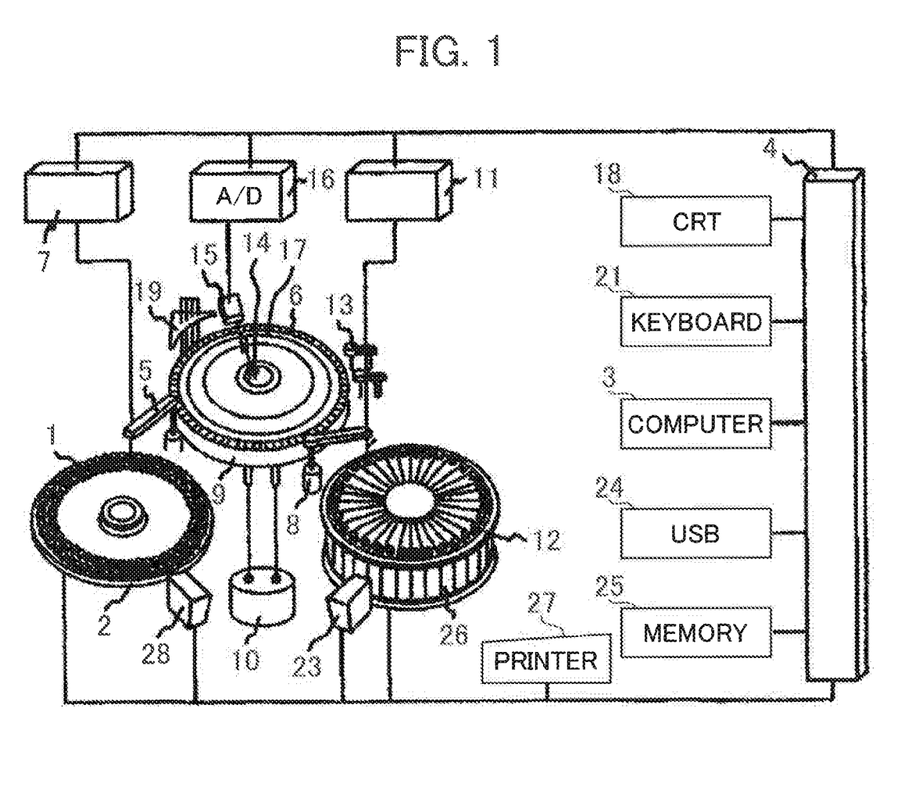
FIG. 1 is a diagram showing a general structure of an automatic analyzer to which the present invention is applied.

FIG. 1 is a diagram showing a general structure of an automatic analyzer to which the present invention is applied. In FIG. 1, a multiplicity of sample vessels 1 accommodating samples therein are arranged on a sample transport disk (sample vessel transport mechanism) 2. An aspiration/discharge nozzle of a sample dispensing mechanism 5 is connected to a sample syringe driver 7. Operations of the syringe driver 7 and the sample dispensing mechanism 5 are controlled by a microcomputer 3 that performs control of operations of the mechanism units and calculation of measurement data, through an interface 4. Therefore, the microcomputer 3 is an operation control unit that performs an analysis and operation control.

A multiplicity of reaction vessels 6 are arranged on a reaction table 17 provided to be rotatable relative to a reaction vessel transport mechanism 9 having reaction bathtubs (reaction baths), to form a reaction line. A constant-temperature liquid maintained at 37° C. is supplied from a constant temperature liquid supply section 10 to the reaction baths at the reaction vessel transport mechanism 9. A multi-wavelength photometer includes a light source 14 and a multi-wavelength spectroscope 15, and the reaction table 17 is rotated such that a light beam from the light source 14 crosses a row of the reaction vessels 6. The reaction vessel 6 used is washed by a washing mechanism 19, and is reused.

A agitating mechanism 13 mixes a sample discharged into the reaction vessel 6 and a reagent liquid corresponding to the analysis item. A measurement signal based on the reaction liquid obtained by the multi-wavelength spectroscope 15 is converted from an analog signal into a digital signal by an A/D converter 16, and the digital signal is inputted to the microcomputer 3.

On a reagent disk (reagent transport mechanism) 26 for reagents, many kinds of reagent bottles (reagent vessels) 12 corresponding to analysis items are disposed along the circumference of a circle. In other words, the disk 26 is a reagent bottle accommodating section capable of selective rotation. A barcode reader 23 is disposed in the vicinity of the disk 26. A reagent dispensing mechanism 8 includes a reagent dispensing pipetter and a reagent syringe driver 11.

The reagent dispensing mechanism 8 having the reagent dispensing pipetter aspirates and holds predetermined amounts of reagent liquids in reagent bottles 12 stopped at an aspiration position into aspiration/discharge nozzles, rotates the aspiration/discharge nozzles onto the row of the reaction vessels 6, and discharges the held reagent liquids into the reaction vessels 6 stopped at a reagent receiving position. The reagent liquids dispensed in this instance are of the kinds corresponding to the analysis items allocated to the reaction vessels 6.

Figure 2A:
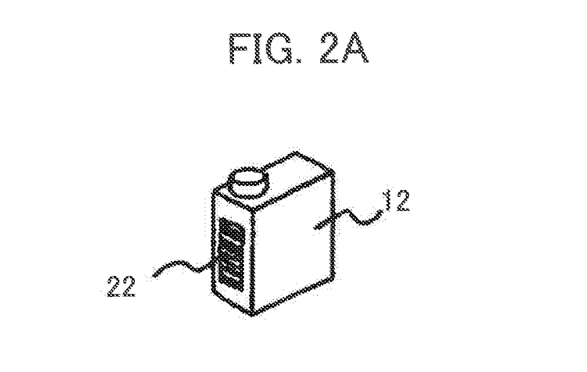
FIG. 2A is a diagram showing a barcode label attached to a vessel.

As shown in FIG. 2A, a reagent barcode label 22 with a barcode printed thereon is adhered to an outer wall of each reagent bottle 12. Examples of the information represented as the barcode 22 printed on the barcode label 22 include a reagent bottle code peculiar to each bottle and including a sequential number, the size of the bottle, the expiration date of the reagent liquid, a reagent dispensing order representing whether a reagent in question is a first reagent, a second reagent or a third reagent, the maximum number of times the reagent liquid can be analyzed, a reagent dispensing amount representing the dispensing amount used at one time, and a production lot number.

In FIG. 1, the reagent information read from each reagent bottle 12 by the barcode reader 23 is stored in a corresponding memory area in the storage unit (memory) 25 or the microcomputer 3. The reagent information is read by the barcode reader 23 attendantly on the accommodation of the reagent bottle 12 on the reagent disk 26, and, in that instance, a signal indicative of a set position of each reagent bottle 12 is outputted by a rotational angle sensor provided in each reagent disk 26, and is inputted to the microcomputer 3 through the interface 4. The reagent information, the bottle set position and the analysis item are stored in the state of corresponding to one another.

An operator of the automatic analyzer can input various kinds of information by use of a screen of a CRT (display unit) 18 and a keyboard (operation input portion) 21. The measurement results of analysis items can be represented by a printer 27 and the CRT 18. Information from a USB 24 is read by a reader, and is stored in a relevant memory area in the storage unit 25 or the microcomputer 3. Note that the display unit 18 is not limited to the CRT, and a liquid crystal or the like can be used.

Note that the operation input portion 21 may include a mouse in addition to the keyboard.

Examples of the information stored in the USB 24 include the following: an analysis item code represented by five digits; parameters used in common to the analysis items; and parameters stored separately on a reagent bottle basis. Of these kinds of information, the parameters used in common to the analysis items include a wavelength used in the photometer, sample amount, a calibration method, a standard liquid concentration, the number of standard liquids, check limit values for abnormal analysis, and so on. In addition, parameters on the basis of each reagent bottle 12 include the kind of reagent, the order of dispensing of reagents, reagent bottle code, reagent liquid volume, reagent dispensing amount, the maximum number of times analysis can be made, reagent production date, and so on.

Operating conditions of each mechanism unit of the automatic analyzer, analysis parameters for each analysis item, determination logic for performing bottle management for each reagent, the maximum number of times analysis can be made which is read from the reagent bottle, analytical results, and the like are stored in the storage unit 25, in addition to the information read from the USB 24.

The reagent information is provided by a recording medium such as a floppy disk supplied by a maker at the time of delivery of the reagent bottle 12. In the case where the reagent information is not prepared by a floppy disk or the like, the information described on a visual check paper attached to the reagent bottle 12 can be inputted to the automatic analyzer by the operator using the screen of the CRT 18 and the keyboard 21.

Figure 2B:
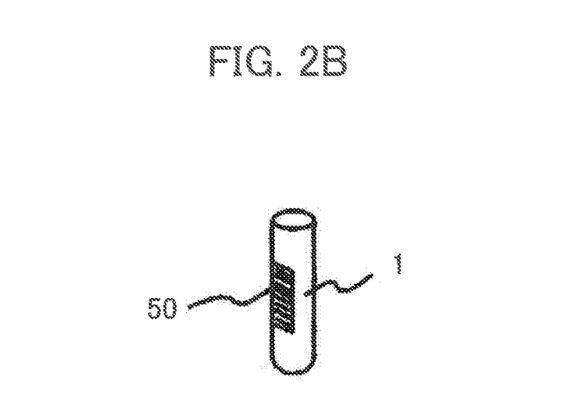
FIG. 2B is a diagram showing a barcode label attached to a vessel.

As shown in FIG. 2B, a sample barcode label 50 with a barcode printed thereon is adhered to an outer wall of the sample vessel 1. The information represented as the barcode is, for example, a sample ID number that uniquely determines a sample. This number is read by the barcode reader 28, and, by detection of rotational angle of the sample transport disk 2, the correspondence between the sample position and the sample ID number is recognized.

On the other hand, since the analysis items corresponding to the sample ID numbers are preliminarily inputted by the keyboard 21 and the CRT 18 and stored, the sample position and the sample ID number and the analysis item are, in the end, stored in the state of corresponding to one another at the time of the above-mentioned barcode reading. In addition, by the higher-order digits of the sample ID number, whether the sample in question is a standard sample or a control sample or a general sample can generally be distinguished.

The analysis by the automatic analyzer as a whole is executed in the order of sampling, reagent dispensing, agitating, photometry, washing of reaction vessel, and data processing such as concentration conversion.

A plurality of sample vessels 1 filled with samples are disposed on the sample transport disk 2. The sample transport disk 2 is controlled by the computer 3 through the interface 4. In addition, the sample transport disk 2 causes the barcode reader 28 to read the barcode 50 on the outer surface of the sample vessel 1, and causes the sample and the analysis item to correspond to each other. Thereafter, the sample vessels 1 are rotationally moved to a lower side of a probe of the sample dispensing mechanism 5 according to the order of the samples to be analyzed, and the sample in the predetermined sample vessel 1 is dispensed in a predetermined amount into the reaction vessel 6 by an operation of a sample syringe driver 7 connected to the sample dispensing mechanism 5.

The reaction vessel 6 into which the sample has been dispensed is moved in a reaction bath of the reaction vessel transport mechanism 9 to a first reagent addition position. A predetermined amount of the reagent aspirated from the reagent vessel 12 by an operation of the reagent syringe driver 11 connected to the aspiration/discharge nozzle of the reagent dispensing mechanism 8 is added to the reaction vessel 6 thus moved.

The reaction vessel 6 after the addition of the first reagent is moved to the position of the agitating mechanism 13, and first agitating is conducted. In the case where reagents of up to a fourth reagent are set for the reagent disk 26, such a reagent addition-agitating operation is performed for the first to fourth reagents.

A light flux emitted from the light source 14 is transmitted through the reaction vessel 6 in which the contents have been agitated, and the absorbance in this instance is detected by the multi-wavelength spectroscope 15. An absorbance signal detected is sent through the A/D converter 16 and the interface 4 to the computer 3, and is converted into the concentration of the sample. The data converted into the concentration is outputted by printing by the printer 27 through the interface 4, and is displayed on the screen of the CRT 18. The reaction vessel 6 having undergone the photometry is moved to the position of the washing mechanism 19, where the matter inside the reaction vessel 6 is discharged by a vessel washing pump (not shown), the reaction vessel 6 is washed with a washing liquid, and the reaction vessel 6 is served to the next analysis.

Figure 3:
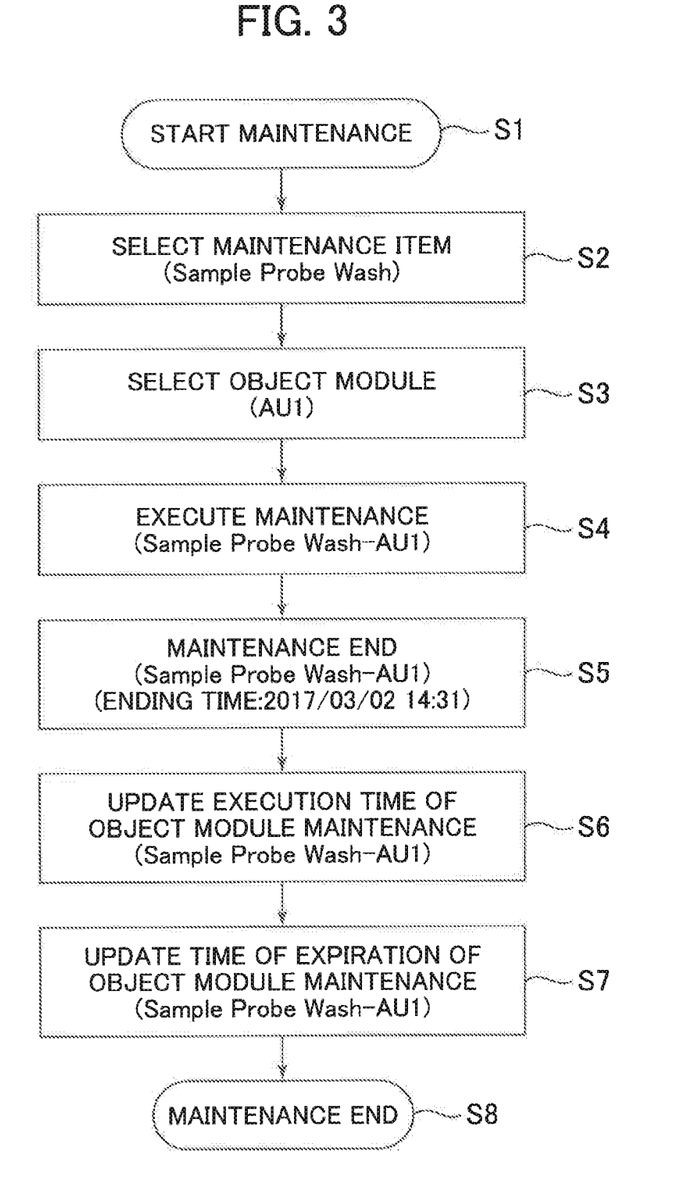
FIG. 3 is a flow chart showing the steps of a maintenance process.
Figure 4:
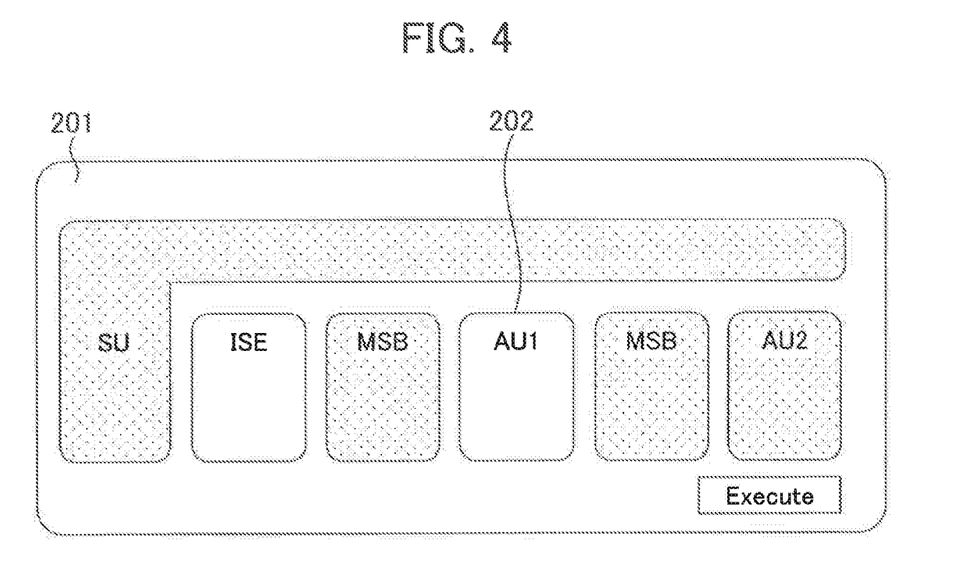
FIG. 4 is a diagram showing a module selection screen of the automatic analyzer.
Figure 5:
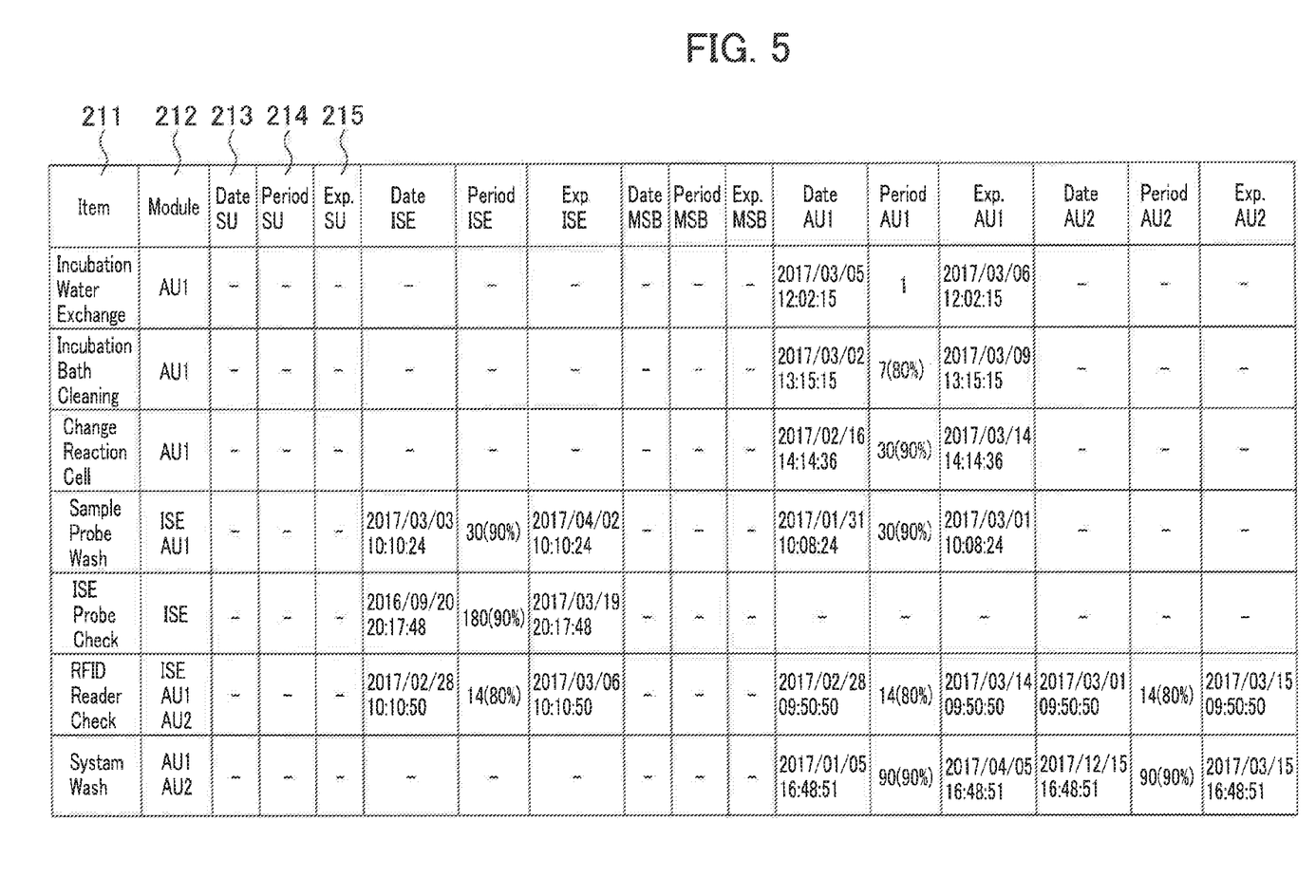
FIG. 5 is a diagram showing a display example of maintenance management information.

FIG. 3 is a diagram showing a general operation flow from the start of maintenance to the end by the automatic analyzer. An operation control for the automatic analyzer of the operation flow shown in FIG. 3 is performed by the computer (operation control unit) 3. In addition, FIG. 4 shows an example in which the automatic analyzer includes a plurality of operation modules, and is a diagram showing a screen for selecting an object operation module of the operation modules (a sampler unit (preprocessing module (SU)), an electrolyte measurement unit (ISE), a sample buffer module (MSB), and analysis units (AU1, AU2)). The electrolyte measurement unit (ISE) and the analysis units (AU1, AU2) can be defined as analysis modules. The analysis modules each include the sample vessel transport mechanism 2, the reagent transport mechanism 26, the reaction vessel transport mechanism 9, the sample dispensing mechanism 5 and the reagent dispensing mechanism 8. Besides, FIG. 5 is a diagram showing maintenance management information displayed on the screen, and FIG. 6 is a diagram showing a maintenance screen.

Note that in the flow shown in FIG. 3, description will be made by taking, as an example, Sample Probe Wash maintenance in which the ISE module and the AU1 module is an object of maintenance, out of a plurality of maintenances.

Figure 6:
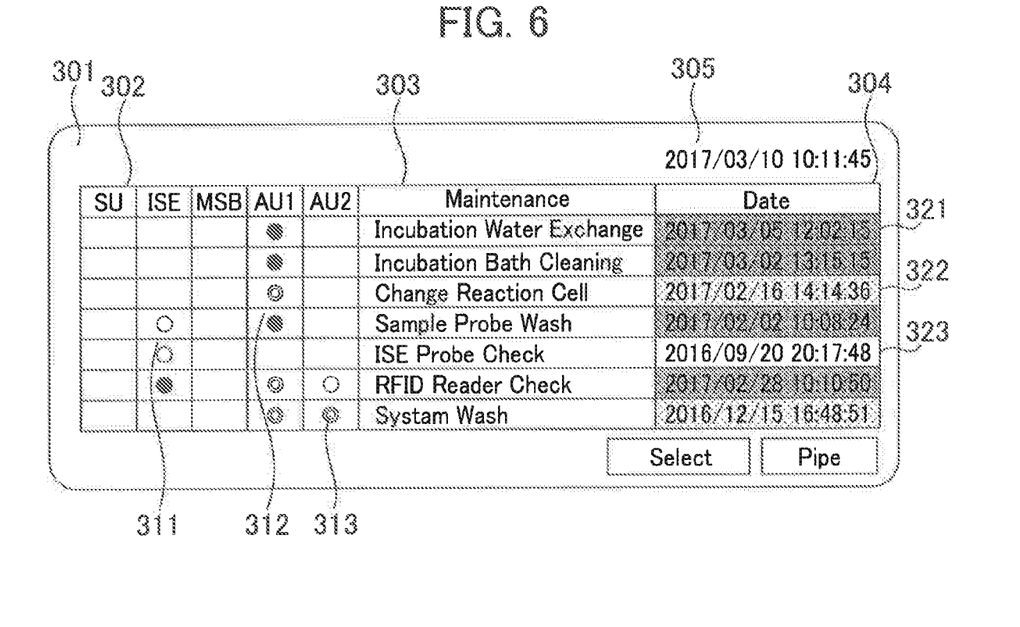
FIG. 6 is a diagram showing an example of maintenance state display screen.

In FIG. 3, a maintenance process is started (step S1), and Sample Probe Wash among maintenance items is selected on a maintenance screen 301 shown in FIG. 6 (step S2). Next, on a maintenance selection screen 201 shown in FIG. 4, AU1 as an execution object module 202 of the Sample Probe Wash maintenance is selected (step S3), an execution button 203 (Execute button) is depressed to perform maintenance (step S4).

When the Sample Probe Wash maintenance of the AU1 is normally finished (step S5), a maintenance execution time of the object module AU1 of Sample Probe Wash is updated (step S6). In addition, a maintenance expiration time for the object module AU1 of Sample Probe Wash is also updated (step S7), and the maintenance process is finished (step S8).

Maintenance management information shown in FIG. 5 will be described. In FIG. 5, as maintenance management information, there are displayed maintenance item 211 of items for which maintenance is conducted, maintenance execution module 212 for which maintenance items can be executed, maintenance execution time 213 showing maintenance execution time, expiration date for maintenance 214 of maintenance expiration, and expiration time for maintenance 215 of the time at which maintenance expires.

The maintenance item 211 includes Incubation Water Exchange, Incubation Bath Cleaning, Change Reaction Cell, Sample Probe Wash, electrolyte measuring device probe check (ISE Probe Check), RFID Reader Check, and System Wash.

The maintenance execution time 213, the expiration date for maintenance 214 and the expiration time for maintenance 215 are stored and held in each of the modules shown in the maintenance execution module 212. The maintenance execution time 213 is managed in terms of year, month, day, hour, minute and second. The expiration date for maintenance 214 is displayed for calculation by expressing the date (day, month, year) in terms of days. For example, for an item for which maintenance should be periodically conducted once per week, 7 is stored and held. This means 7 days (one week).

While the maintenance execution time 213, the expiration date 214 and the expiration time 215 are shown for the case of the preprocessing module (SU), the maintenance execution time and the expiration date and the expiration time are displayed also for each of the electrolyte measurement unit (ISE), the sample buffer module (MSB) and the analysis units (AU1, AU2). With respect to the same maintenance items common to the plurality of analysis modules (ISE, AU1, AU2), the expiration dates and expiration times are stored in the memory 25 on an analysis module basis.

As for the expiration time for maintenance 215, the expiration date for maintenance 214 is added to the maintenance execution time 213, and the expiration date is stored. Note that with respect to the expiration date for maintenance 214, the period from the maintenance execution time to the expiration date is displayed in terms of percent, and when the displayed percent is exceeded, a display for alerting the user is performed.

On the maintenance screen 301 of FIG. 6, there are a module display 302, a maintenance item display 303, a maintenance executing time display 304, and a system current time 305 for displaying the current system time, and the current time 305 serves as a reference for checking the maintenance expiration date.

The module display 302 is displayed on a module basis, and it displays maintenance state of each module. A normal module state 311 is marked with a circle, showing a valid state after maintenance.

An expired module state 312 is marked with a black solid circle, displaying a state in which the maintenance expiration date has come from the execution of maintenance. An expiration cautioned module state 313 is marked with a double circle, displaying a state in which the expiration date set by the user is approaching. Since expiration influences the analytical results, a caution period is provided beforehand, which is a state in which the maintenance expiration time 305 is approaching.

The maintenance execution time display 304 displays the maintenance execution time. In the case of a maintenance item relevant to a plurality of modules, a time at which the expiration date is approaching is displayed. For example, in the case of Sample Probe Wash in the maintenance item display 303, the relevant modules are the ISE and the AU1.

In the maintenance management information shown in FIG. 5, the AU1 module of Sample Probe Wash is an expired module, and maintenance execution priority thereof is high. In comparison, the ISE is in an expiration cautioned module state, and maintenance execution priority thereof is low. Therefore, in Date 304 of FIG. 6, the maintenance time for the AU1 with high priority is displayed.

The expiration time 321 of FIG. 6 is displayed in the case where there is a module expired with respect to the relevant maintenance item. For example, in the case of Sample Probe Wash, the AU1 module is expired, and, therefore, the expiration time 321 is displayed. The expiration cautioned time state 322 is displayed in the case where expiration caution is present with respect to the relevant module. The normal time state 323 is displayed in the case where there is no expired module or no expiration caution. The expiration time 321, the expiration cautioned time state 322 and the normal time state 323 are displayed by identification representation for identifying them, and, along with these, the execution time is displayed on the maintenance screen 301. The identification representation may be any one that permits identification, such as a representation of different shades or a representation in different colors.

The display method for the expiration time 321 may be different from the display method for the expiration cautioned time state 322 and the normal time state 323. For example, the display color for the expiration time 321 may be different from those for the other states 322 and 323, to thereby realize an emphasized display. For example, the display color of the expiration time 321 is red display, and the other states are displayed in a different color or colors.

The maintenance screen 301 of FIG. 6 displays information acquired from the maintenance management information of FIG. 5 in a predetermined period, and, therefore, always displays the newest information.

Figure 7:
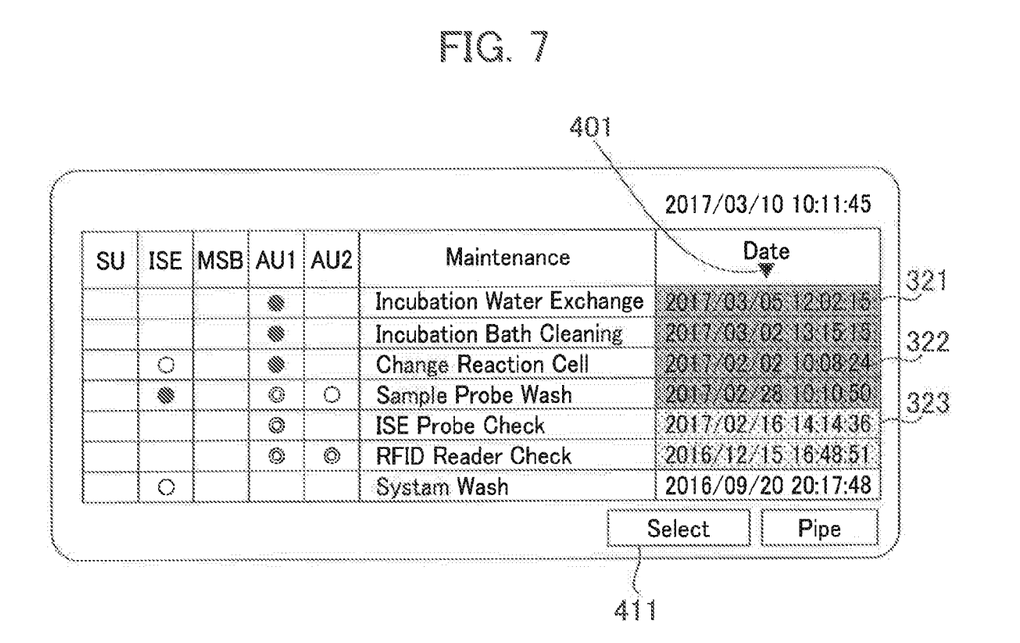
FIG. 7 is a diagram showing an example of screen displaying rearranged maintenance process times.

FIG. 7 is a screen display after the maintenance process is rearranged according to the priority order of expiration and expiration caution, based on maintenance execution time display 401.

In the maintenance item display 303 of FIG. 6, (Incubation Water Exchange), (Incubation Bath Washing), (Sample Probe Wash), and (RFID Reader Check) are all in a state in which the maintenance execution time display 304 has been expired. The expiration time 321 has a high priority needing execution of maintenance, and is displayed sequentially from the head of the maintenance execution time display 401 in FIG. 4. Next, the expiration cautioned time state 322 is arranged, and the normal time state 323 is finally disposed. The result of this is the display shown in FIG. 7.

As a result, the user can confirm the maintenance items with high priority from the maintenance execution time, and can recognize it easily. Particularly, in the case where the number of maintenance items is large, it may be difficult to display all the maintenance items on one screen; for example, it may be impossible to confirm the priority of all the maintenance items without scrolling the displayed information by a scroll bar. In such a case, by rearranging the maintenance items, the maintenances with high execution priority can be put together at the upper side, whereby the user can confirm the maintenance items with high execution priority on one screen at once, without scrolling the displayed information. As a result, required maintenances can be efficiently executed, without omission.

Figure 8:
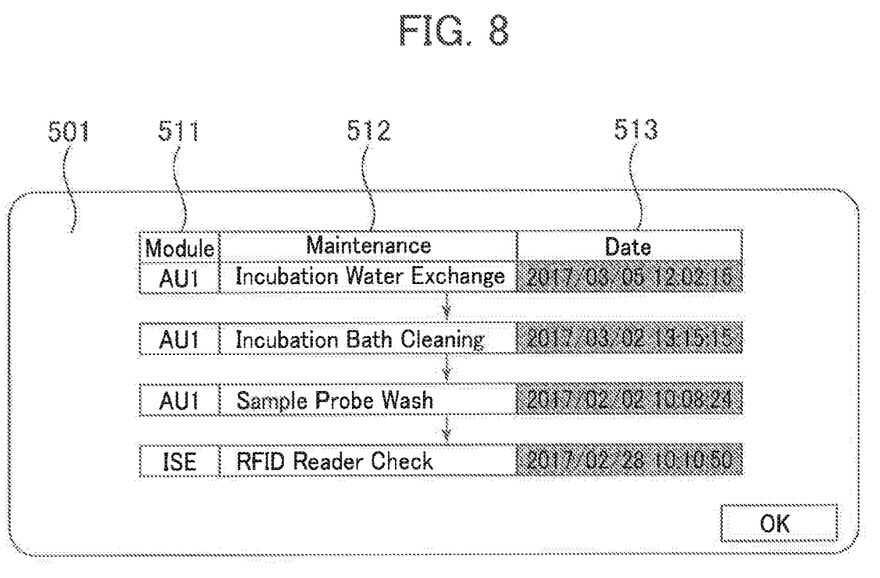
FIG. 8 is a diagram showing an example of maintenance execution schedule screen.

FIG. 8 is a diagram showing a screen (maintenance execution schedule screen) 501 for executing together the expiration time 321 rearranged in a rearranged time display 401. Depressing a maintenance time selection button 411 after the rearrangement is finished in FIG. 7 produces a display screen of FIG. 8. On the screen shown in FIG. 8, there are displayed an execution module 511 of the module to be executed, an execution maintenance 512 of a maintenance item selected in FIG. 7, and a maintenance execution time 513. The execution order is in the order of (Incubation Water Exchange) in AU1, (Incubation Bath Cleaning) in AU1, (Sample Probe Wash) in AU1, and ISE (RFID Reader Check), and it can be recognized that these have been expired in the modules shown. Depressing an OK button 514 on the screen shown in FIG. 8 causes a scheduled maintenance to be executed.

Figure 9:
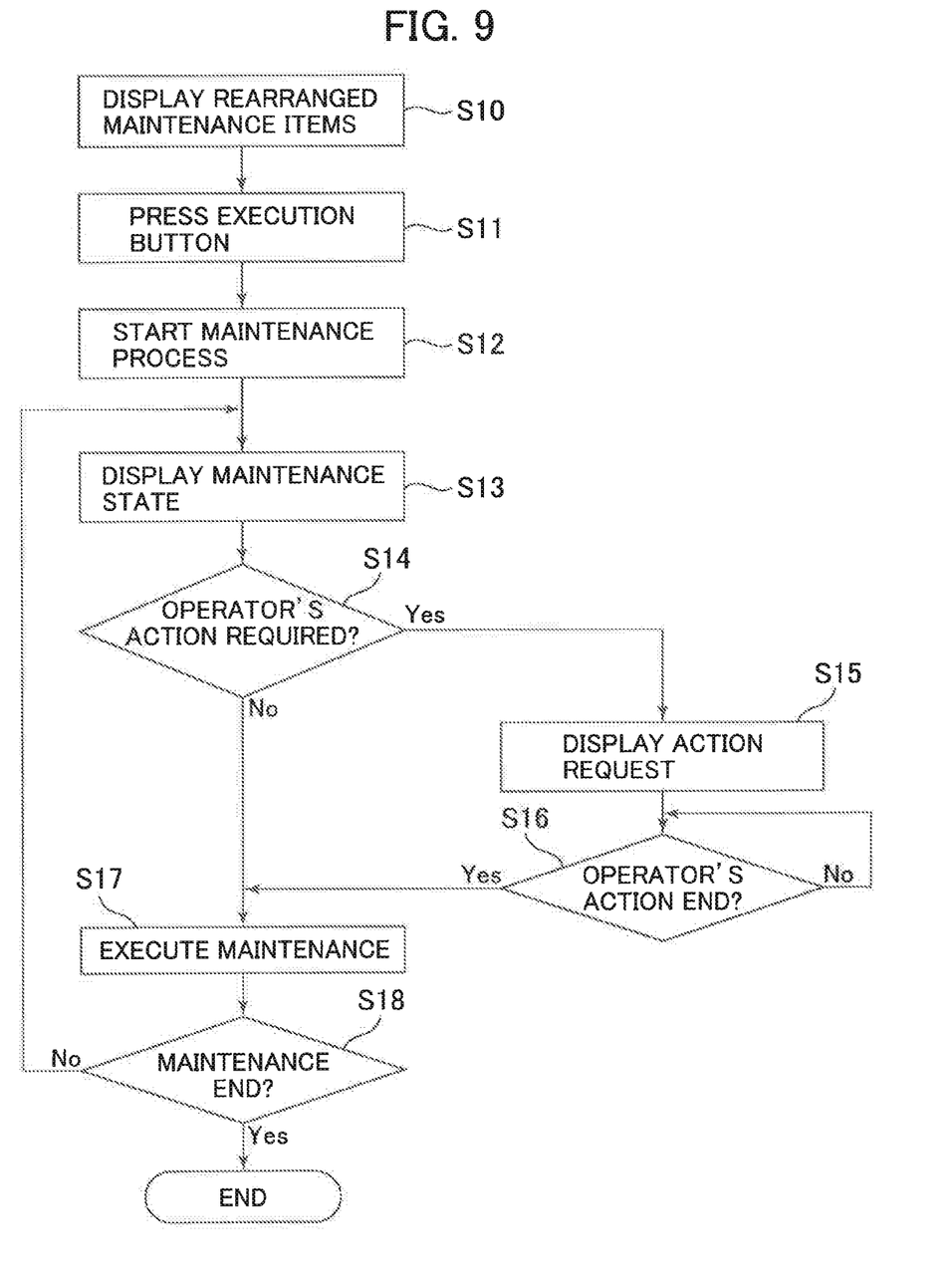
FIG. 9 is a detailed flow chart showing a maintenance execution process.

FIG. 9 is a detailed flow chart of step S4 shown in FIG. 3.

When the maintenances to be executed are rearranged in the execution order as shown in FIG. 8 and the operator depresses the execution button 514, a maintenance process is started (steps S10 to S12). Then, the maintenance state is displayed (step S13). With respect to the maintenance being executed currently, the color display of the item shown in FIG. 8 may be made in a different color from other items or may be set in a blinking state, whereby the relevant item can be clearly shown as being in maintenance process.

Here, maintenance processes include those which can be automatically executed by the automatic analyzer, and those in which the operator should be involved. For example, cleaning of the reaction bath needs operator's wash. In addition, exchange of the reaction vessel also needs the operator's operation.

On the other hand, reaction bath water exchange, wash of sample dispensing probe, ISE probe wash, RFID reader check, and system wash do not need the operator's involvement.

Figure 10:
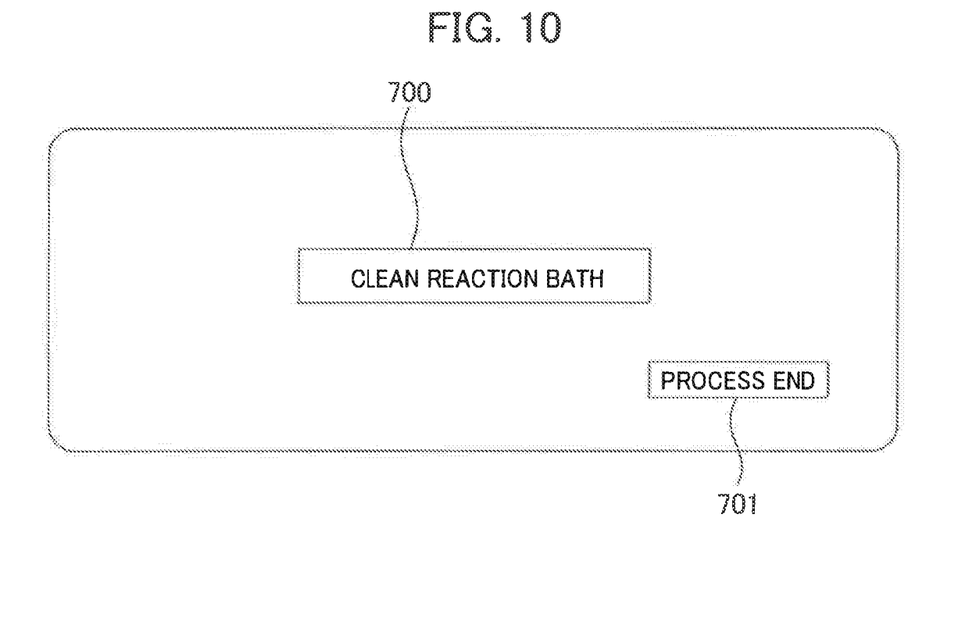
FIG. 10 is a diagram showing a display screen example of a case where an operator should be involved in the operation.

Therefore, in the case where an operator's operation is necessary, a request for the operator's operation is displayed on the screen (steps S14 and S15). This is made, for example, in the case where cleaning of the reaction bath is needed, by outputting a message 700 emphasizing need for cleaning reaction bath, as shown in FIG. 10. Then, when the cleaning of the reaction bath is finished, the operator depresses a process end button 701 (step S16).

Then, the process proceeds to step S17, where maintenance is executed. In the case where the operator's operation is unnecessary in step S14, the control proceeds to step S17.

When the maintenances mentioned on the screen as shown in FIG. 8 are not yet finished, the control returns to step S13, whereas when the mentioned maintenances have all been finished, the process is finished.

Figure 11:
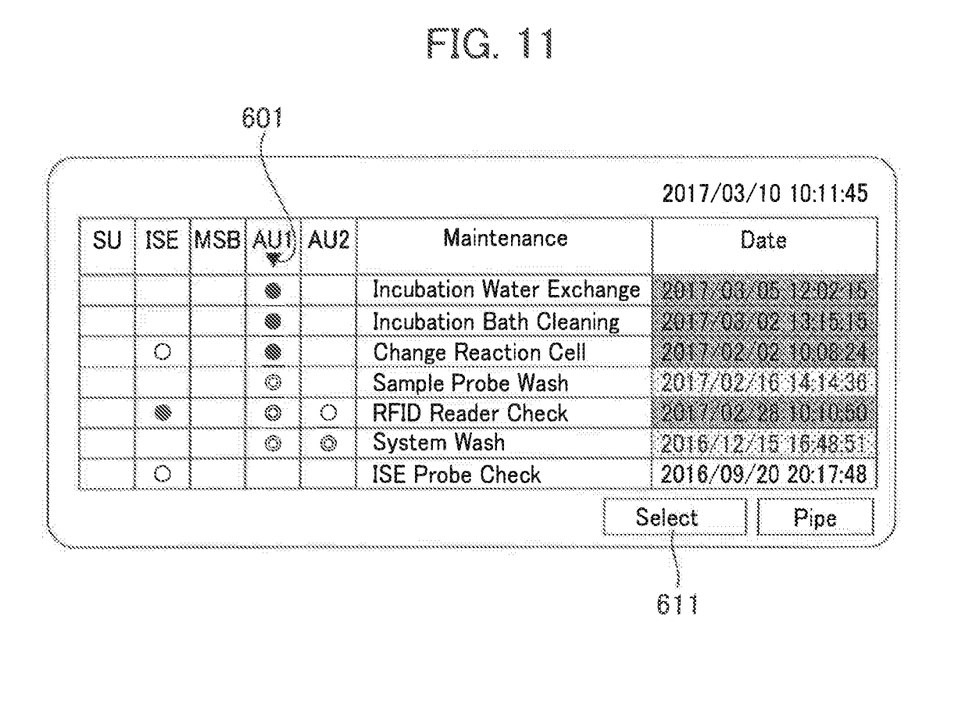
FIG. 11 is a diagram showing another example of screen displaying rearranged maintenance process times.

FIG. 11 is a diagram showing a rearranged module display 601 as to priority order of expiration time and expiration cautioned time, on a module basis, of the module display 302 shown in FIG. 6. By rearranging with the AU1 as a reference, the maintenance items which are high in maintenance execution priority in the AU1 can be confirmed. By selecting the module names in the module display 302, the rearrangement can be realized. Note that in regard of the order of rearrangement, the expiration module state 321 is high in priority, and, therefore, is displayed at the head. Next, the expiration cautioned module state 322 is arranged.

As a result, the user can confirm the maintenance items with high priority for each module, so that the user can easily recognize. Note that the maintenances which should be executed can be executed collectively.

With a module selection button 611 selected (depressed) on the screen on which the maintenances have been rearranged with reference to the AU1, the maintenances can be executed collectively.

Note that while an example in which the normal module state, the expired modulation state and the expiration cautioned module state are displayed with different marks as shown in FIG. 6 has been shown as a preferable example, a mark permitting identification of a maintenance execution module 212 for which a maintenance item can be executed may merely be displayed in FIG. 6. There is a case where it is sufficient to perform an identification representation or an emphasized representation of the expiration time 321 as alerting the user. In this case, a display permitting the operator to identify whether or not a maintenance item in question can be executed is displayed. Then, the display order of maintenance items can be rearranged based on the above-mentioned displays (marks) and the rearranged maintenance items can be displayed at the display unit 18. In this case, also, as shown in FIG. 11, it is possible, by selecting the module names, to rearrange the maintenance items in such a manner that the maintenance items which can be executed are displayed at the upper side. Such a rearrangement ensures that the states of each maintenance item such as the expiration time 321 can be identified by the user, with reference to the maintenance item which can be executed for a specific module. In this case, while the maintenance items may be displayed by arranging them in a date order though they cannot be rearranged in a priority level order, it is desirable to rearrange the maintenance items in such a manner that the expiration times 321 are put together.

Note that while an example of rearranging the maintenance items with reference to "AU1" has been shown in FIG. 11, it is also possible, by similarly selecting the module names with reference to "AU2" or "ISE," to rearrange the maintenance items in such a manner that the maintenance items which can be executed are displayed at the upper side.

Figure 12:
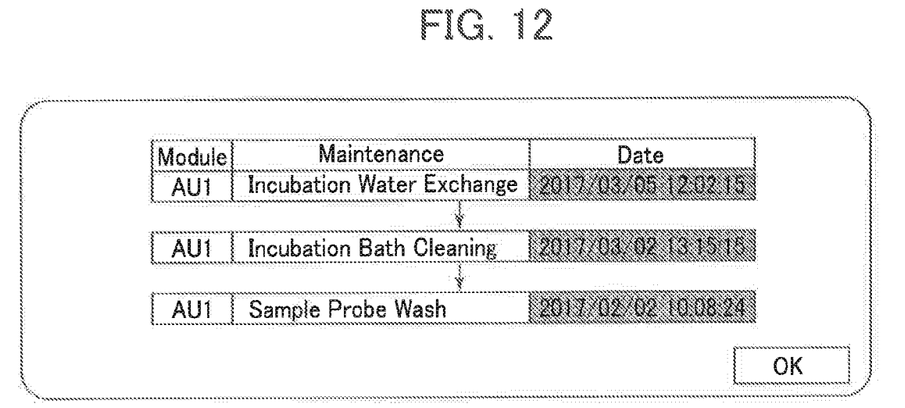
FIG. 12 is a diagram showing another example of maintenance process execution schedule screen.

FIG. 12 is a screen for executing collectively the maintenances rearranged in FIG. 11. Like shown in FIG. 8, with the OK button depressed, the scheduled maintenance is executed.

Figure 13:
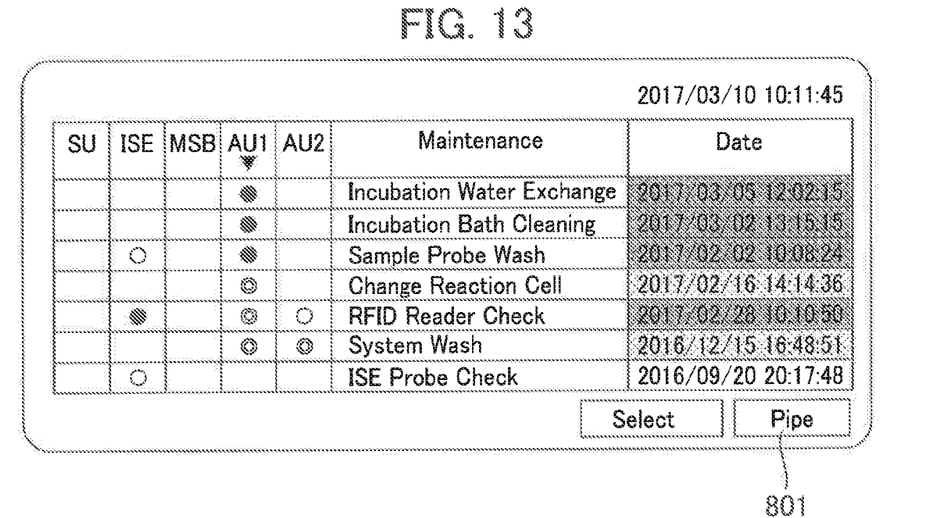
FIG. 13 is a diagram of maintenance execution schedule screen showing an example of pipe setting.

FIG. 13 is a screen for executing, as Pipe, the maintenances rearranged on the module display 302.

Figure 14:
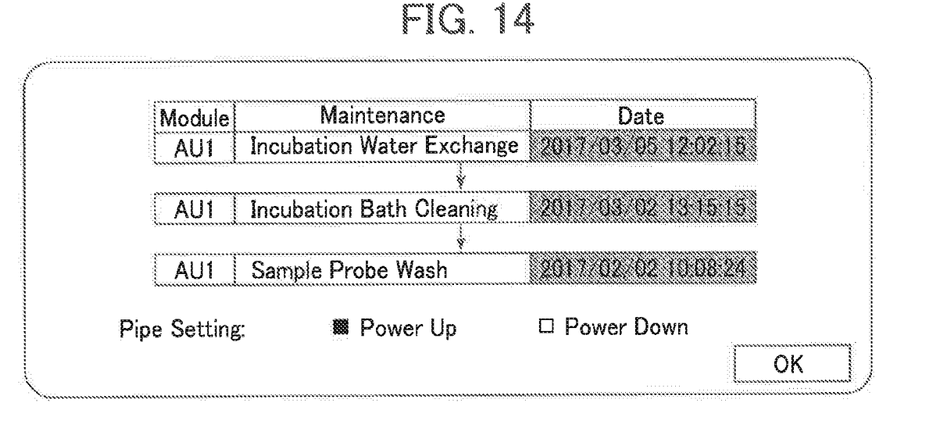
FIG. 14 is a diagram showing an example of maintenance process execution schedule screen in the case of pipe setting.

When the maintenance items selected on the maintenance item display 303 of FIG. 6, namely, (Incubation Water Exchange), (Incubation Bath Cleaning), and (Sample Probe Wash) are selected, a rearranged display is conducted and a pipe button 801 is selected, the screen shown in FIG. 14 is displayed.

FIG. 14 is a diagram showing a screen for displaying a schedule and a pipe setting with which the maintenances can be executed. As for the pipe setting, in order to execute a scheduled maintenance item at the time of start-up after turning on the power source for the automatic analyzer, Power Up is selected. On the contrary, in order to execute a scheduled maintenance item at the time of shut-down by turning off the power source for the automatic analyzer, Power Down is selected and the OK button is depressed.

As a result, by setting as a pipe such that an expired item or an expiration cautioned item can be automatically executed, the user can perform secure maintenance.

It is to be noted, however, that in the case of a setting such that turning on or off of the power source is automatically performed, the operator may not be present in the vicinity of the automatic analyzer. In such a case, it is possible to make such a setting that only the maintenance items for which involvement of the operator is unnecessary can be pipe processed.

As has been described above, according to the present invention, it is possible to realize an automatic analyzer capable of executing required maintenances efficiently, without omission. It is possible to realize an automatic analyzer which is able to set a priority order of maintenance items to be executed, is able to support an operator when the operator should be involved in executing the maintenance, and is able to execute required maintenances efficiently, without omission.

In addition, whether the required maintenance items are to be executed at the time of turning on the power source for the automatic analyzer or at the time of turning off the power source can be selectively set, and, therefore, the required maintenance items can be automatically executed in a suitable order, at other times than the time of normal operation of the automatic analyzer.

Note that while the maintenance schedule table, and maintenance execution, of the operation mechanism units for each operation module of automatic analysis having a plurality of operation modules have been described, the present invention is also applicable to an automatic analyzer not having a plurality of operation modules. In that case, the screen display shown in FIG. 6 is a display of maintenance for each of operation mechanisms (the sample transport mechanism 2, the reagent transport mechanism 26, the reaction vessel transport mechanism 9, the sample dispensing mechanism 5, the reagent dispensing mechanism 8, the barcode readers 23 and 28, the light source 14, the multi-wavelength spectroscope 15, the agitating mechanism 13, and the like) in only the AU1.

Besides, the present invention is also applicable to other items than the maintenance items in the aforementioned example, and is applicable to maintenance of the sample transport mechanism 2, the reagent transport mechanism 26, the reaction vessel transport mechanism 9 having the reaction bath, the sample dispensing mechanism 5, and the reagent dispensing mechanism 8.

In addition, the automatic analyzer having the plurality of modules as shown in FIG. 4 includes the reaction vessel transport mechanism for transporting the reaction vessels, the reagent vessel transport mechanism, the sample dispensing mechanism for dispensing the sample into the reaction vessel, and the reagent dispensing mechanism for dispensing the reagent into the reaction vessel, and includes the operation control unit, the display unit, the operation input portion, and the sample vessel transport mechanism, thereby being established as an automatic analyzer.

REFERENCE SIGNS LIST

1: sample vessel
2: sample transport disk (sample vessel transport mechanism)
3: microcomputer (operation control unit)
4: interface
5: sample dispensing mechanism
6: reaction vessel
7: sample syringe driver
8: reagent dispensing mechanism
9: reaction vessel transport mechanism
10: constant temperature liquid supply portion
11: reagent syringe driver
12: reagent bottle (reagent vessel)
13: agitating mechanism
14: light source for multi-wavelength photometer
15: multi-wavelength spectroscope
16: A/D converter
17: reaction table
18: CRT
19: washing mechanism
21: keyboard
22: reagent barcode label
23, 28: barcode reader
24: USB
25: memory (storage unit)
26: reagent disk (reagent transport mechanism)
27: printer
50: sample barcode label
201: maintenance selection screen
202: execution object module
211: maintenance item
212: maintenance execution module
213: maintenance execution time
214: expiration date for maintenance
215: expiration time for maintenance
301: maintenance screen
302: module display
303: maintenance item display
304: maintenance execution time display
305: system current time
311: normal module state
312: expired module state
313: expiration cautioned module state
321: expiration time
322: expiration cautioned time state
323: normal time state
401: maintenance execution time display
411: maintenance time selection button
501: maintenance execution schedule screen
511: execution module
512: executed maintenance
513: maintenance execution time
601: rearranged module display
611: module selection button
700: message emphasizing need for cleaning reaction bath
701: process end button
801: pipe button
S1 to S8, S10 to S18: process steps

The invention claimed is:

1. An automatic analyzer comprising:
a plurality of analysis modules each including:
a sample vessel transport mechanism for transporting sample vessels;
a reagent vessel transport mechanism for transporting reagent vessels;
a reaction vessel transport mechanism including a reaction bath and operative to transport reaction vessels;
a sample dispensing mechanism for dispensing a sample in the reaction vessel; and
a reagent dispensing mechanism for dispensing a reagent in the reaction vessel;
a display unit;
an operation input portion;
a memory;
an operation control unit that controls the operations of the plurality of analysis modules and the display unit, and that conduct an analysis of the sample placed in the reaction vessel,
wherein the operation control unit is configured to:
stores, in the memory, for each of a plurality of maintenance items of the analysis modules, an expiration date of performing maintenance and a maintenance execution time indicating a time when maintenance was performed,
display, on the display unit, the maintenance execution time along with identification information indicating an execution priority based on the expiration date,
simultaneously display, on the display unit, the individual maintenance items of each of the plurality of analysis modules, the maintenance execution time for each of the maintenance items and a mark for each maintenance item, the mark identifying an analysis module for which the maintenance item corresponds, receive an input via the operation input portion indicating to rearrange a display order of the displayed maintenance items, rearrange the display order of the maintenance items based on an execution priority, which is based on the respective execution times of the maintenance items, and display the rearranged maintenance items on the display unit.

2. The automatic analyzer according to claim 1,
wherein the operation control unit is configured to execute the maintenance items by controlling the sample vessel transport mechanism, the reagent vessel transport mechanism, the reaction vessel transport mechanism, the sample dispensing mechanism or the reagent dispensing mechanism according to the display order of maintenance items displayed on the display unit.

3. The automatic analyzer according to claim 2,
wherein the operation control unit is configured to display some expired maintenance items, of the maintenance items, differently from other maintenance items.

4. The automatic analyzer according to claim 3,
wherein the operation control unit is configured to, at start-up of the automatic analyzer, automatically execute the maintenance items.

5. The automatic analyzer according to claim 3,
wherein when an action of the operator is required for some of the maintenance items, the operation control unit is configured to display a request for the operator's action at the display unit.

6. The automatic analyzer according to claim 1,
wherein the operation control unit is configured to, for each of the analysis modules, display the expired maintenance items differently than the other maintenance items.

7. The automatic analyzer according to claim 1,
wherein the operation control unit is configured to rearrange the maintenance items in a display order based on the marks and display the rearranged items at the display unit.

8. The automatic analyzer according to claim 1,
wherein as to the same maintenance item common to the plural analysis modules, the operation control unit is configured to store, in the memory, the expiration date and execution time of the common maintenance item on a per-analysis-module basis.

9. The automatic analyzer according to claim 1,
wherein the operation control unit is configured to:
display respective names of each of the plurality of analysis modules and the plurality of maintenance items in column and row directions.

10. The automatic analyzer according to claim 9,
wherein the operation control unit is configured to rearrange the display order of the maintenance items based on the marks.

11. The automatic analyzer according to claim 9,
wherein the marks represent, for each of the maintenance items per analysis module, whether a maintenance item in question is in a normal state, in a state of caution of the maintenance expiration date, or in a state that the maintenance expiration data has elapsed.

* * * * *